(12) United States Patent
    Oh

(10) Patent No.: US 12,612,067 B2
(45) Date of Patent: Apr. 28, 2026

(54) AUTONOMOUS DRIVING CONTROL APPARATUS AND METHOD THEREOF

(71) Applicants:HYUNDAI MOTOR COMPANY, Seoul (KR); Kia Corporation, Seoul (KR)

(72) Inventor: Tae Dong Oh, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 236 days.

(21) Appl. No.: 18/143,723

(22) Filed: May 5, 2023

(65) Prior Publication Data

US 2024/0116532 A1    Apr. 11, 2024

(30) Foreign Application Priority Data

Sep. 22, 2022    (KR) ........................ 10-2022-0120277

(51) Int. Cl.
    *B60W 60/00*        (2020.01)
    *B60W 40/06*        (2012.01)
(52) U.S. Cl.
    CPC .......... *B60W 60/001* (2020.02); *B60W 40/06* (2013.01); *B60W 2556/35* (2020.02); *B60W 2556/40* (2020.02); *B60W 2556/45* (2020.02)
(58) Field of Classification Search
    CPC .............. B60W 60/001; B60W 40/06; B60W 2556/40; B60W 2556/45; B60W 2556/35
    See application file for complete search history.

(56) References Cited

U.S. PATENT DOCUMENTS

| | | | | |
|---|---|---|---|---|
| 12,158,348 | B1* | 12/2024 | Choi ........................ | G06N 5/01 |
| 2021/0133466 | A1* | 5/2021 | Gier ..................... | G05D 1/0223 |
| 2022/0281456 | A1* | 9/2022 | Giovanardi ............ | G06V 20/58 |
| 2024/0075953 | A1* | 3/2024 | Shin .................. | B60W 60/0015 |

OTHER PUBLICATIONS

Kai Hormann et al., "The point in polygon problem for arbitrary polygons", Computational Geometry 20 (2001) 131-144.

* cited by examiner

*Primary Examiner* — Peter D Nolan
*Assistant Examiner* — Mikko Okechukwu Obioha
(74) *Attorney, Agent, or Firm* — MORGAN, LEWIS & BOCKIUS LLP

(57)        ABSTRACT

An autonomous driving control apparatus for determining an object using high definition map and sensor fusion on a road with a gradient and a method thereof are provided. The autonomous driving control apparatus includes a sensor that obtain information about an object around a vehicle, a communication device that receives information about a high definition map around the vehicle, and a processor electrically connected with the sensor and the communication device The processor navigates a vehicle lane link and a target lane link based on the information about the object and the information about the high definition map, determines a valid contour region by applying a valid contour verification algorithm to the vehicle lane link and the target lane link, and recognizes an object in the valid contour region.

18 Claims, 8 Drawing Sheets

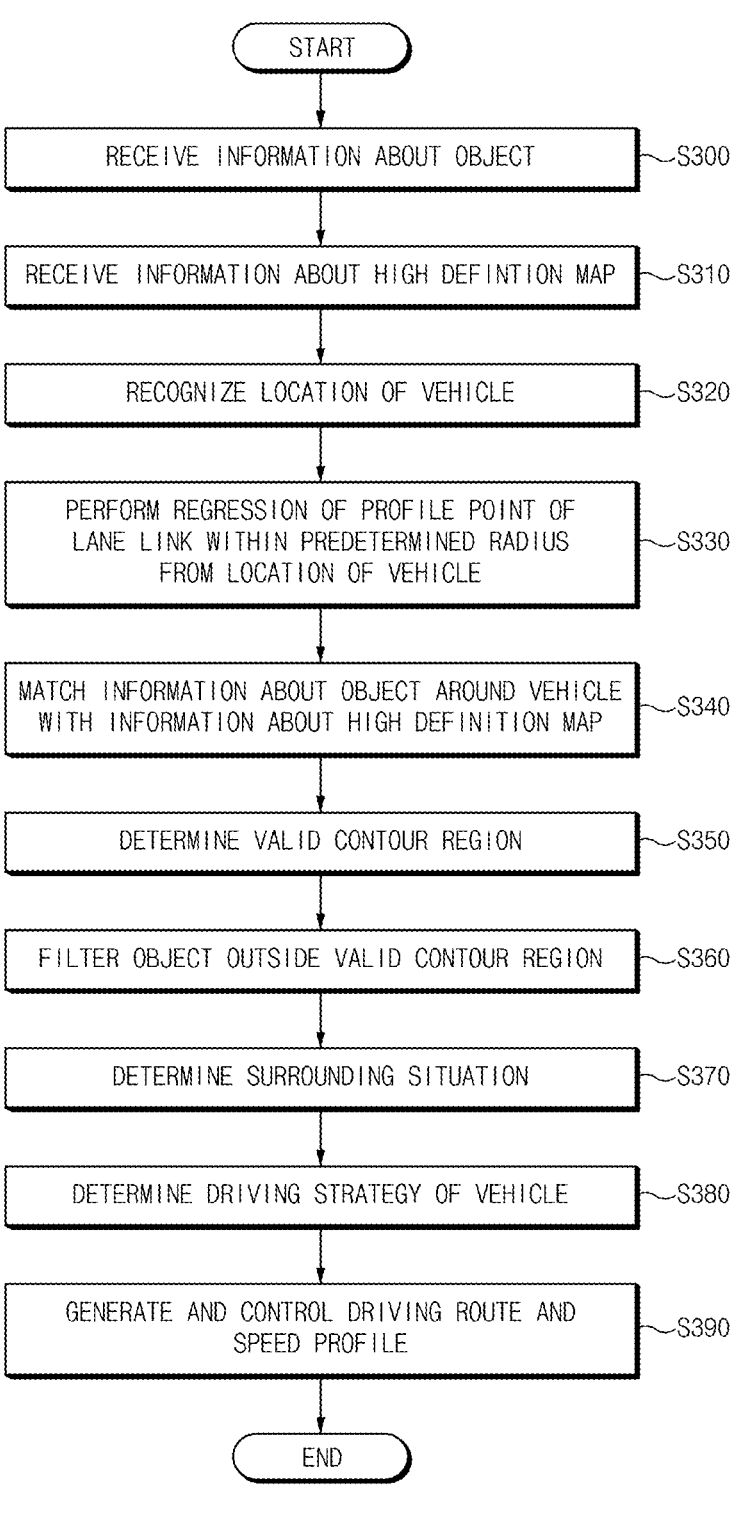

START

RECEIVE INFORMATION ABOUT OBJECT — S300

RECEIVE INFORMATION ABOUT HIGH DEFINTION MAP — S310

RECOGNIZE LOCATION OF VEHICLE — S320

PERFORM REGRESSION OF PROFILE POINT OF LANE LINK WITHIN PREDETERMINED RADIUS FROM LOCATION OF VEHICLE — S330

MATCH INFORMATION ABOUT OBJECT AROUND VEHICLE WITH INFORMATION ABOUT HIGH DEFINITION MAP — S340

DETERMINE VALID CONTOUR REGION — S350

FILTER OBJECT OUTSIDE VALID CONTOUR REGION — S360

DETERMINE SURROUNDING SITUATION — S370

DETERMINE DRIVING STRATEGY OF VEHICLE — S380

GENERATE AND CONTROL DRIVING ROUTE AND SPEED PROFILE — S390

END

Fig.3

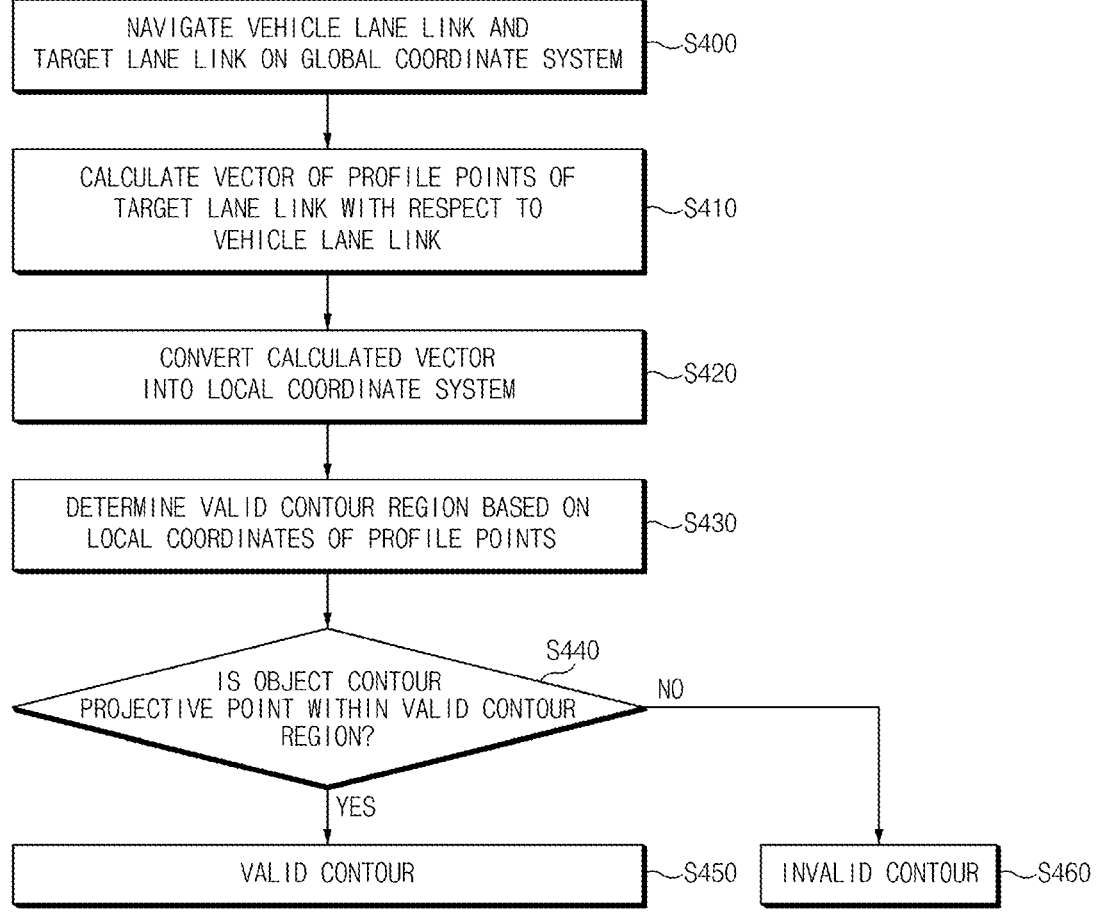

NAVIGATE VEHICLE LANE LINK AND
TARGET LANE LINK ON GLOBAL COORDINATE SYSTEM — S400

CALCULATE VECTOR OF PROFILE POINTS OF
TARGET LANE LINK WITH RESPECT TO
VEHICLE LANE LINK — S410

CONVERT CALCULATED VECTOR
INTO LOCAL COORDINATE SYSTEM — S420

DETERMINE VALID CONTOUR REGION BASED ON
LOCAL COORDINATES OF PROFILE POINTS — S430

S440
IS OBJECT CONTOUR
PROJECTIVE POINT WITHIN VALID CONTOUR
REGION?

NO

YES

VALID CONTOUR — S450

INVALID CONTOUR — S460

Fig.4

AUTONOMOUS DRIVING CONTROL APPARATUS AND METHOD THEREOF

CROSS-REFERENCE TO RELATED APPLICATION

This application claims the benefit of priority to Korean Patent Application No. 10-2022-0120277, filed in the Korean Intellectual Property Office on Sep. 22, 2022, the entire contents of which are incorporated herein by reference.

TECHNICAL FIELD

The present disclosure relates to an autonomous driving control apparatus for determining an object using high definition map and sensor fusion on a road with a gradient.

BACKGROUND

An autonomous driving system uses a scheme where a sensor is combined with a high definition map after sensor fusion, that is, a local dynamic map (LDM) scheme. Because a high definition map route and altitude information are used after sensor fusion in the LDM scheme, correction for an altitude is limited in a sensor fusion step. Thus, when there is no determination of altitude information about an object, object misrecognition frequently occurs in a situation such as a hill section or tunnel entry and exit.

Particularly, because occlusion due to many objects around the vehicle occurs in a city environment, it is difficult to track a road surface. There are a method for finding a road surface point using a height threshold, a method for finding a concentric circle using that a point obtained by a light detection and ranging (LiDAR) has a concentric circle form on a flat road surface and determining the found concentric circle as the road surface, a method for experimentally obtaining that an intensity value of the LiDAR is uniformly output from the road surface using a reflection coefficient of LiDAR data, a method for classifying points at intervals of a cell and distinguishing whether respective cells are a road surface, and a method for obtaining a virtual road surface plane function and fitting the virtual road surface plane function to a tertiary plane for distinguishing a road surface point in an existing road surface navigation algorithm. Herein, in the first and second methods, detection performance deteriorates in a slope road surface which is irregular in longitudinal and lateral directions. In the third method, detection performance degradation may occur depending a road surface shape and weather. In the fourth and fifth methods, an underfitting problem may occur. The first to fifth methods are vulnerable to occlusion caused by an object around the vehicle. This may cause serious performance degradation.

SUMMARY

The present disclosure has been made to solve the above-mentioned problems occurring in the prior art while advantages achieved by the prior art are maintained intact.

An aspect of the present disclosure provides an autonomous driving control apparatus for determining altitude information for each lane with regard to a longitudinal gradient and/or a lateral gradient on a route where a vehicle travels depending on a driving strategy of the vehicle on a generalized road to determine a high reliability section (or a valid contour region) of an object to minimize object misrecognition on a road with a gradient and a method thereof.

Another aspect of the present disclosure provides an autonomous driving control apparatus for determining a specific range from the road surface with regard to a pitch of the vehicle on a high definition map and a longitudinal location according to a location of another vehicle to minimize object misrecognition and/or non-recognition and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous driving control apparatus may include a sensor that obtain information about an object around a vehicle, a communication device that receives information about a high definition map around the vehicle, and a processor electrically connected with the sensor and the communication device. The processor may navigate a vehicle lane link and a target lane link based on the information about the object and the information about the high definition map, may determine a valid contour region by applying a valid contour verification algorithm to the vehicle lane link and the target lane link to, and may recognize an object in the valid contour region.

The processor may navigate a lane link matched with a vehicle location on a global coordinate system as the vehicle lane link.

The processor may navigate all lane links within a predetermined radius with respect to a vehicle location on a global coordinate system as the target lane link.

The processor may navigate a lane link matched with a location of the object around the vehicle on a global coordinate system as the target lane link.

The processor may calculate a vector between the vehicle lane link and the target lane link, may rotational transform the calculated vector into a local coordinate system with respect to a center point of a front bumper of the vehicle, and may set the valid contour region based on the rotational transformed vector.

The processor may calculate profile points by reflecting a valid height in profile points of the target lane link and may calculate the vector for the profile points of the target lane link and the profile points in which the valid height is reflected with respect to a profile point of the vehicle lane link, the profile point being matched with the center point of the front bumper of the vehicle.

The valid height may be determined by a height for each object.

The processor may transform global coordinates of the profile points of the target lane link and the profile points in which the valid height is reflected into local coordinates.

The processor may generate a polygon using the profile points converted into the local coordinates and may set the valid contour region based on the polygon.

The processor may determine a projective point onto which a contour point of the object is projected is located within the valid contour region, may determine the contour point of the object as a valid contour point, in response to determining that the projective point is located within the valid contour region, may determine the contour point of the object as an invalid contour point, in response to determining that the projective point is not located within the valid contour region, and may filter an object having the invalid contour point.

According to another aspect of the present disclosure, an autonomous driving control method may include receiving information about an object around a vehicle and a high definition map around the vehicle, navigating a vehicle lane link and a target lane link based on the information about the object and the high definition map, determining a valid contour region by applying a valid contour verification algorithm to the vehicle lane link and the target lane link, and recognizing an object in the valid contour region.

The navigating of the vehicle lane link and the target lane link may include navigating a lane link matched with a vehicle location on a global coordinate system as the vehicle lane link and navigating all lane links within a predetermined radius with respect to the vehicle location as the target lane link.

The navigating of the vehicle lane link and the target lane link may include navigating a lane link matched with a vehicle location on a global coordinate system as the vehicle lane link and navigating a location of the object around the vehicle as the target lane link.

The determining of the valid contour region may include calculating a vector between the vehicle lane link and the target lane link, rotational transforming the calculated vehicle into a local coordinate system with respect to a center point of a front bumper of the vehicle, and setting the valid contour region based on the rotational transformed vector.

The calculating of the vector may include calculating profile points by reflecting a valid height in profile points of the target lane link and calculating the vector for the profile points of the target lane link and the profile points in which the valid height is reflected with respect to a profile point of the vehicle lane link, the profile point being matched with the center point of the front bumper of the vehicle.

The valid height may be determined by a height for each object.

The rotating and transforming may include transforming global coordinates of the profile points of the target lane link and the profile points in which the valid height is reflected into local coordinates.

The setting of the valid contour region may include generating a polygon using the profile points converted into the local coordinates and setting the valid contour region based on the polygon.

The recognizing of the object may include determining a projective point onto which a contour point of the object is projected is located within the valid contour region, determining the contour point of the object as a valid contour point, in response to determining that the projective point is located within the valid contour region, determining the contour point of the object as an invalid contour point, in response to determining that the projective point is not located within the valid contour region, and filtering an object having the invalid contour point.

The autonomous driving control method may further include analyzing only an object in the valid contour region to determine a situation around the vehicle, determining a driving strategy according to the situation around the vehicle, generating a driving route and a speed profile based on the driving strategy, and controlling a behavior of the vehicle depending on the driving route and the speed profile.

BRIEF DESCRIPTION OF THE DRAWINGS

The above and other objects, features and advantages of the present disclosure will be more apparent from the following detailed description taken in conjunction with the accompanying drawings:

FIG. 3 is a flowchart illustrating an operation of an autonomous driving control apparatus according to an embodiment of the present disclosure;

FIG. 4 is a flowchart illustrating a process of verifying a valid contour according to embodiments of the present disclosure;

DETAILED DESCRIPTION

Figure 1:
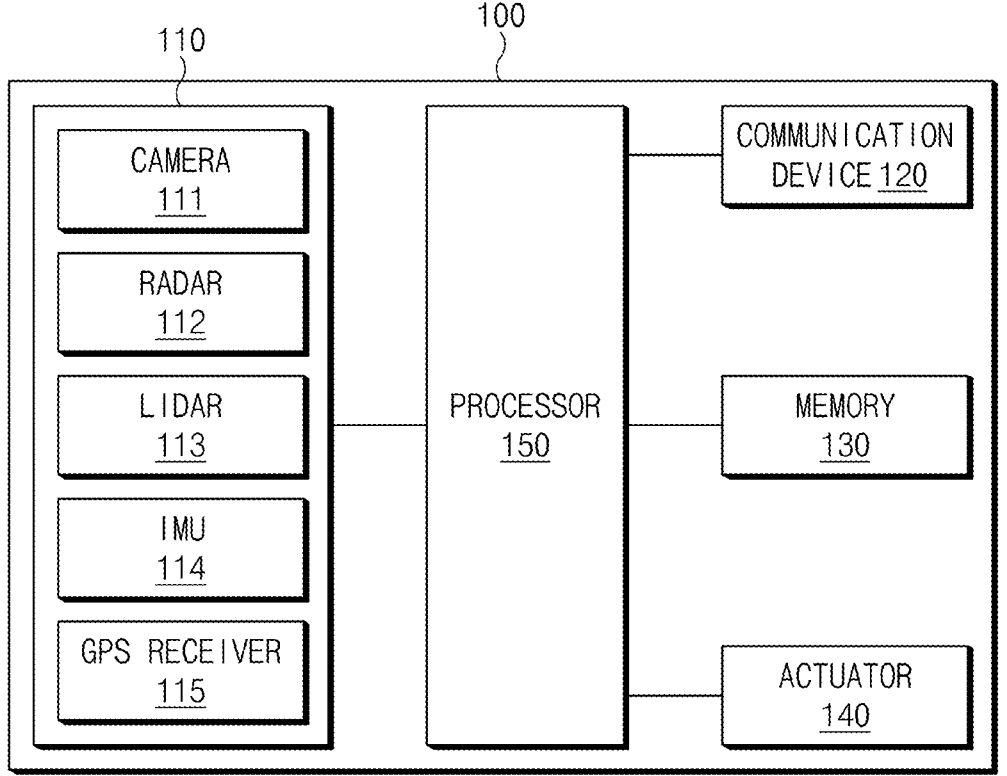
FIG. 1 is a block diagram illustrating a configuration of an autonomous driving control apparatus according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In the specification, a lane link is a line connecting two points on the road, which refers to a road section. There are N profile points in each lane link. Two profile points may make up one segment. The profile points may become denser as the road curvature more increases and may become denser as the difference between altitude values more increase. This has high resolution in a section with a large change to well represent the fact that a change in curvature and/or altitude is large.

Although a change in gradient frequently occurs on the actual curved surface, but when continuous changes in gradient are not taken into account or intermittent road tracking is not performed, because it may cause misrecognition or non-recognition of an object, which may pose a great risk to vehicle driving, the specification presents a technology of determining an object using high definition map and sensor fusion on a road with a gradient.

FIG. 1 is a block diagram illustrating a configuration of an autonomous driving control apparatus according to embodiments of the present disclosure.

An autonomous driving control apparatus 100 may be mounted a vehicle capable of performing autonomous driving. The autonomous driving control apparatus 100 may include sensors 110, a communication device 120, a memory 130, an actuator 140, and/or a processor 150.

The sensors 110 may obtain information about an object around the vehicle, vehicle behavior information, and/or vehicle location information using sensors mounted on the vehicle. The sensors 110 may include a camera 111, a radio detecting and ranging (radar) 112, a light detection and ranging (LiDAR) 113, an inertial measurement unit (IMU) 114, and/or a global positioning system (GPS) receiver 115.

The camera 111 may obtain an image around the vehicle. The camera 111 may be installed on at least one of the front, rear, left, and right sides of the vehicle. The camera 111 may include at least one of image sensors such as a charge coupled device (CCD) image sensor, a complementary metal oxide semiconductor (CMOS) image sensor, a charge priming device (CPD) image sensor, or a charge injection device (CID) image sensor. The camera 111 may include an image processor for performing image processing, such as noise cancellation, color reproduction, file compression, image quality adjustment, and saturation adjustment, for an image obtained by means of the image sensor.

The radar 112 may generate an electromagnetic wave to an object around the vehicle and may receive an electromagnetic wave reflected from the object (or the object around the vehicle) to identify a distance between the vehicle and the object, a direction of the object, an altitude of the object, and/or the like.

The LiDAR 113 may radiate a laser pulse to measure an arrival time of a laser pulse reflected from the object around the vehicle and may calculate space location coordinates of the reflection point to identify a distance between the vehicle and the object, a shape of the object, and the like.

The IMU 114 may measure a speed, a direction, gravity, acceleration, or the like of the vehicle. The IMU 114 may measure 3-axis (e.g., progress direction, lateral direction, and longitudinal direction) acceleration and a 3-axis (roll, pitch, and yaw) angular speed and may calculate information about a behavior of the vehicle, for example, a speed, an attitude angle, and the like based on the 3-axis acceleration and the 3-axis angular speed.

The GPS receiver 115 may receive a signal transmitted from a satellite and may calculate a current location of the vehicle using the received signal. The GPS receiver may calculate a distance between the satellite and the GPS receiver 115 using a time difference between a time when the satellite transmits a signal and a time when the GPS receiver 115 receives the signal. The GPS receiver 115 may calculate the current location of the vehicle using the calculated distance between the satellite and the GPS receiver 115 and location information of the satellite, which is included in the transmitted signal. At this time, the GPS receiver 115 may calculate the current location using triangulation.

The sensors 110 may sense (or measure) data (or a measurement value) for an object (e.g., a surrounding vehicle, a pedestrian, a sign, traffic lights, and/or the like) located around the vehicle using the camera 111, the radar 112, the LiDAR 113, and/or the like. The sensors 110 may fuse (or merge) pieces of data sensed by the camera 111, the radar 112, the LiDAR 113, and/or the like to generate object information. The sensors 110 may transmit the generated object information to the processor 150.

The communication device 120 may assist the autonomous driving control apparatus 100 to perform communication between the autonomous driving control apparatus 100 and an external electronic device (e.g., an electronic control unit (ECU), a navigation device, audio video navigation (AVN), a server, a smartphone, and/or the like). The communication device 120 may include vehicle-to-everything (V2X) communication circuit. The V2X communication circuit may assist in vehicle-to-vehicle (V2V) communication, vehicle-to-infrastructure (V2I) communication, vehicle-to-nomadic devices (V2N) communication, an in-vehicle network (IVN) communication, and/or the like. According to an exemplary embodiment of the present disclosure, the communication device 120 may include a processor (e.g., computer, microprocessor, CPU, ASIC, circuitry, logic circuits, etc.) and an associated non-transitory memory storing software instructions which, when executed by the processor, provides the functionalities of the communication device 120. Herein, the memory and the processor may be implemented as separate semiconductor circuits. Alternatively, the memory and the processor may be implemented as a single integrated semiconductor circuit. The processor may embody one or more processor(s).

The memory 130 may store high definition map information. The high definition map information may be updated on a periodic basis or in real time by the high definition map information received through the communication device 120. The memory 130 may store a valid contour verification algorithm, a crossing number algorithm, and the like.

The memory 130 may be a non-transitory storage medium which stores instructions executed by the processor 150. The memory 130 may include at least one of storage media such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM).

The actuator 140 may control a behavior (e.g., acceleration, deceleration, braking, shift, and/or the like) of the vehicle under an instruction of the processor 150. The actuator 140, may include an acceleration actuator, a braking actuator, a shift actuator, a suspension actuator, and/or the like.

The processor 150 may control the overall operation of the autonomous driving control apparatus 100. The processor 150 may include at least one of processing devices such as an application specific integrated circuit (ASIC), a digital signal processor (DSP), a programmable logic device (PLD), a field programmable gate array (FPGA), a central processing unit (CPU), a microcontroller, or a microprocessor.

The processor 150 may receive information about an object around the vehicle (or information about a surrounding object). The sensors 110 may transmit object information generated by fusing the pieces of data measured by the camera 111, the radar 112, and/or the LiDAR 113 to the processor 150. The processor 150 may receive the object information.

The processor 150 may receive the high definition map information through the communication circuitry 120. The processor 150 may receive high definition map information transmitted from the navigation device, the server, or the like through the communication device 120. When a map information transmission condition is met, the navigation device or the server may transmit the high definition map information at a predetermined transmission period or in real time. The processor 150 may receive information about a high definition map within a predetermined certain radius with respect to the current location of the vehicle from the navigation device or the server.

The processor 150 may recognize a location of the vehicle based on the high definition map information. The processor 150 may recognize the location of the vehicle by matching location coordinates of the vehicle, which is obtained by means of the GPS receiver 115, with the high definition map information.

The processor 150 may navigate a target lane link with respect to a lane link matched with the vehicle and the vehicle location.

As an example, the processor 150 may navigate a lane link in a predetermined radius (e.g., 500 m) with respect to the vehicle location as the target lane link.

As another example, the processor 150 may navigate a lane link matched with the object around the vehicle as the target lane link. At this time, the processor 150 may navigate the target lane link based on the object information received from the sensors 110.

The processor 150 may perform regression of a profile point of the lane link when navigating the lane link. When the profile point of the lane link is not sufficient, the processor 150 may interpolate the profile point of the lane link using a regression technique such as interpolation.

The processor 150 may apply a valid contour verification algorithm (or a validation algorithm of a target contour considering a gradient) to the target lane link.

As an example, the processor 150 may apply the valid contour verification algorithm to all lane links within a predetermined radius from the vehicle.

As another example, the processor 150 may apply the valid contour verification algorithm to only lane links with which objects are matched as targets. As such, when applying the valid contour verification algorithm to only the lane links with which the objects are matched as the targets, the processor 150 may improve calculation efficiency for validation of a target contour.

The processor 150 may transform target lane links on a global coordinate system into a local coordinate system of the vehicle using the valid contour verification algorithm. The local coordinate system indicates a progress direction as an x-axis, indicates a lateral direction as a y-axis, and may indicates a longitudinal direction as a z-axis, with respect to a center point of a front bumper of the vehicle. The processor 150 may rotational transform global coordinates of profile points of target lane links with respect to the center point of the front bumper of the vehicle depending on the valid contour verification algorithm to calculate local coordinates of the profile points of the target lane links.

The processor 150 may determine a valid contour region based on the local coordinates of the profile points of the target lane links, which are transformed into the local coordinate system. In other words, the processor 150 may connect the local coordinates of the profile points of the target lane links to generate a polygon. The processor 150 may determine the valid contour region based on the generated polygon.

The processor 150 may filter objects which deviate from the valid contour region (or a valid altitude) using the crossing number algorithm. The processor 150 may project contour points of the nearest objects onto a polygon corresponding to each lane link and may determine whether the projective point is located within the polygon. When it is determined that the projective point (or the object contour projective point) is located within the polygon, the processor 150 may determine the contour point of the objects as a valid contour point. When it is determined that the projective point is not located within the polygon, the processor 150 may determine the contour point of the objects as an invalid contour point. The processor 150 may filter invalid objects using the valid contour point.

The processor 150 may analyze objects remaining after filtering the objects, that is, only objects located within the valid contour region to determine a situation around the vehicle. For example, the processor 150 may determine the situation around the vehicle by analyzing a driving intention of another vehicle (or a surrounding vehicle) located within the valid contour region, a behavior intention of a pedestrian, and/or the like.

The processor 150 may determine a driving strategy of the vehicle based on the determined situation around the vehicle. The processor 150 may generate a driving route and a speed profile based on the determined driving strategy. The processor 150 may control the actuator 140 depending on the generated driving route and the generated speed profile to control a behavior of the vehicle.

Figure 2:
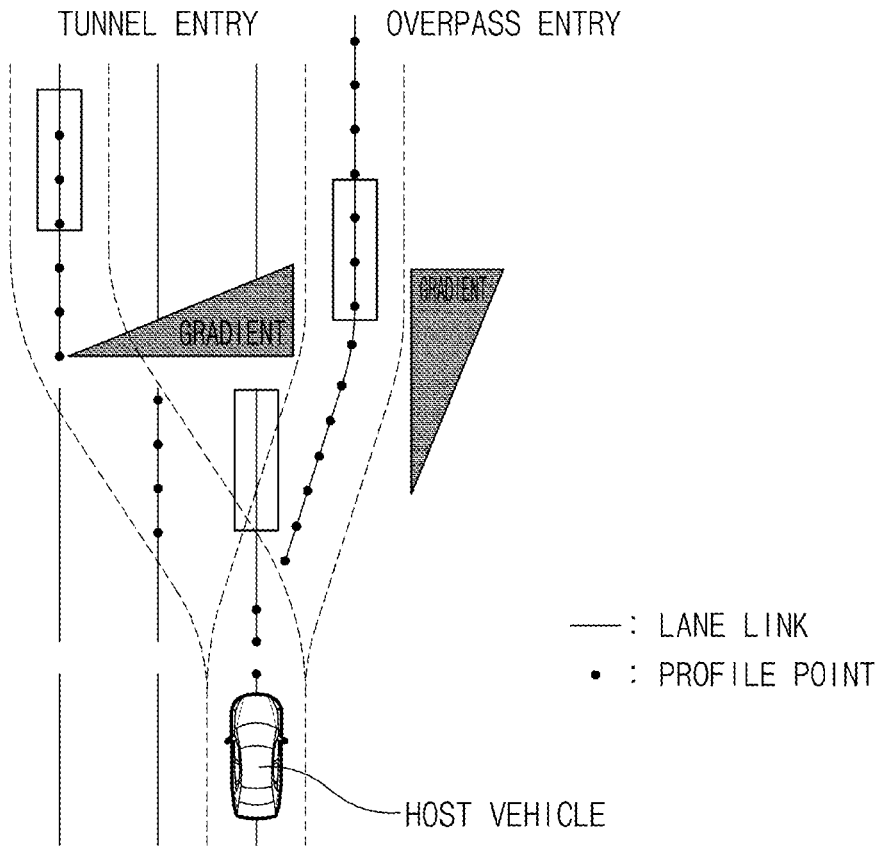
FIG. 2 is a drawing for describing a method for using gradient information for each lane link profile point according to embodiments of the present disclosure.

FIG. 2 is a drawing for describing a method for using gradient information for each lane link profile point according to embodiments of the present disclosure.

When there are a lateral gradient and a longitudinal gradient, gradient information may be reflected in a lane link profile point of a section between the lateral gradient and the longitudinal gradient by means of regression. There are a plurality of profile points in each lane link, and each profile point has coordinates (x, y, z) on a global coordinate system. Because the global coordinate system of the profile point is different from a local coordinate system of a vehicle sensor, there is a need to transform the coordinate system for location comparison.

FIG. 3 is a flowchart illustrating an operation of an autonomous driving control apparatus according to an embodiment of the present disclosure.

Referring to FIG. 3, in S300, a processor 150 of an autonomous driving control apparatus 100 of FIG. 1 may receive information about an object around a vehicle (or information about a surrounding object). The information about the object may be information obtained by fusing (or merging) pieces of data (or measurement values) sensed by sensors such as a camera, a radar, and a LiDAR.

In S310, the processor 150 may receive information about a high definition map through a communication device 120 of FIG. 1. The processor 150 may receive the information about the high definition map from an electronic device such as a navigation device or a server.

In S320, the processor 150 may recognize a location of the vehicle based on the information about the high definition map. The processor 150 may recognize a current location of the vehicle by mapping location information (or coordinate information) received through the GPS receiver 115 onto the information about the high definition map.

In S330, the processor 150 may perform regression of a profile point of a lane link within a predetermined radius from the location of the vehicle. At this time, when the profile point of the lane link within the predetermined radius from the location of the vehicle is not sufficient, the processor 150 may interpolate the profile point of the lane link using a regression technique such as interpolation.

In S340, the processor 150 may match the information about the object around the vehicle with the information about the high definition map. The processor 150 may match the vehicle location information and the object information with the information about the high definition map and may compare and analyze the map, the vehicle, and the object together.

In S350, the processor 150 may determine a valid contour region based on the profile point of the lane link and a valid height. The processor 150 may determine the valid height based on a height for each object. For example, when the height of another vehicle is 3.8 m, the processor 150 may determine the valid height as 4 m.

In S360, the processor 150 may filter an object located out of the determined valid contour region. The processor 150 may determine whether a contour projective point of the object is located within the valid contour region using a crossing number algorithm to determine whether to filter the object depending on the determined result. When the contour projective point of the object is located within the valid contour region, the processor 150 may fail to filter the object. When the contour projective point of the object is located out of the valid contour region, the processor 150 may filter the object.

In S370, the processor 150 may determine a surrounding situation based on information about the filtered object and the information about the high definition map. The processor 150 may determine at least one of a behavior intention of the object, a driving intention, a driving route, or a combination thereof based on the information about the high definition map information and the information about the surrounding object (or information about the object located within the valid contour region).

In S380, the processor 150 may determine a driving strategy of the vehicle based on the determined surrounding situation.

In S390, the processor 150 may generate a driving route and a speed profile according to the determined driving strategy and may perform autonomous driving control of the vehicle based on the generated driving route and the generated speed profile.

FIG. 4 is a flowchart illustrating a process of verifying a valid contour according to embodiments of the present disclosure.

In S400, a processor 150 of an autonomous driving control apparatus 100 of FIG. 1 may navigate a vehicle lane link and a target lane link on a global coordinate system. The vehicle lane link may be a lane link matched with a vehicle location, and a target lane link may be all lane links within a predetermined radius with respect to the vehicle location or a lane link matched with a location of an object around a vehicle.

In S410, the processor 150 may calculate a vector of the target lane link with respect to the vehicle lane link. The processor 150 may calculate a vector of profile points of the target lane link with respect to a profile point of the vehicle lane link. The vector may be calculated with respect to a map location on a lane link matched with the vehicle and the object on a global coordinate system.

In S420, the processor 150 may transform the calculated vector into a local coordinate system. The processor 150 may collectively apply rotation transformation to the profile points of the target lane link with a center point of the front bumper of the vehicle to calculate local coordinates of each profile point.

In S430, the processor 150 may determine a valid contour region based on the local coordinates of the transformed profile points. The processor 150 may generate polygons on the local coordinate system using the rotated and transformed profile points and may determine the valid contour region based on the generated polygons. At this time, the processor 150 may obtain a polygon by means of calculation as many as the number of lane links.

In S440, the processor 150 may determine whether an object contour projective point is within the valid contour region. The object contour projective point is a point obtained by projecting the contour point of the object onto an xz plane. The processor 150 may determine whether the object contour projective point is an internal point located within the valid contour region using a crossing number algorithm. The processor 150 may calculate the crossing number algorithm with a polygon matched with each object as many as the number of objects.

When it is determined that the object contour projective point is within the valid contour region in S440, in S450, the processor 150 may determine the object contour as a valid contour. In other words, the processor 150 may the contour point of the object as the valid contour point.

When it is determined that the object contour projective point is not within the valid contour region in S440, in S460, the processor 150 may determine the object contour as an invalid contour. In other words, when it is determined that the object contour projective point is out of the valid contour region, the processor 150 may determine the object contour as the invalid contour.

To efficiently use the above-mentioned embodiment, the processor 150 may match a shortest lane link on an x-y plane without considering a z-axis when initially matching a lane link of another vehicle. When there are two or more of lane links (e.g., an underpass, an overpass, or the like), the processor 150 may determine one of the two or more lane links with reference to a connection relationship of information about a high definition map around the vehicle.

As an example, because a vehicle which travels on a lane link located in the underpass deviates from a sensor measurement range of the vehicle and is not measured by a sensor of a vehicle which travels on the overpass, the processor 150 may select a lane link located on the overpass without matching the vehicle which travels on the lane link located in the underpass with the lane links located in the underpass.

When finding a valid contour region for all lane links, the processor 150 does not select a lane link initially matched with objects. The processor 150 may regard that the valid contour is measured by the vehicle which travels on the road and may regard that the invalid contour is measured in a region outside a drivable road.

Figure 5:
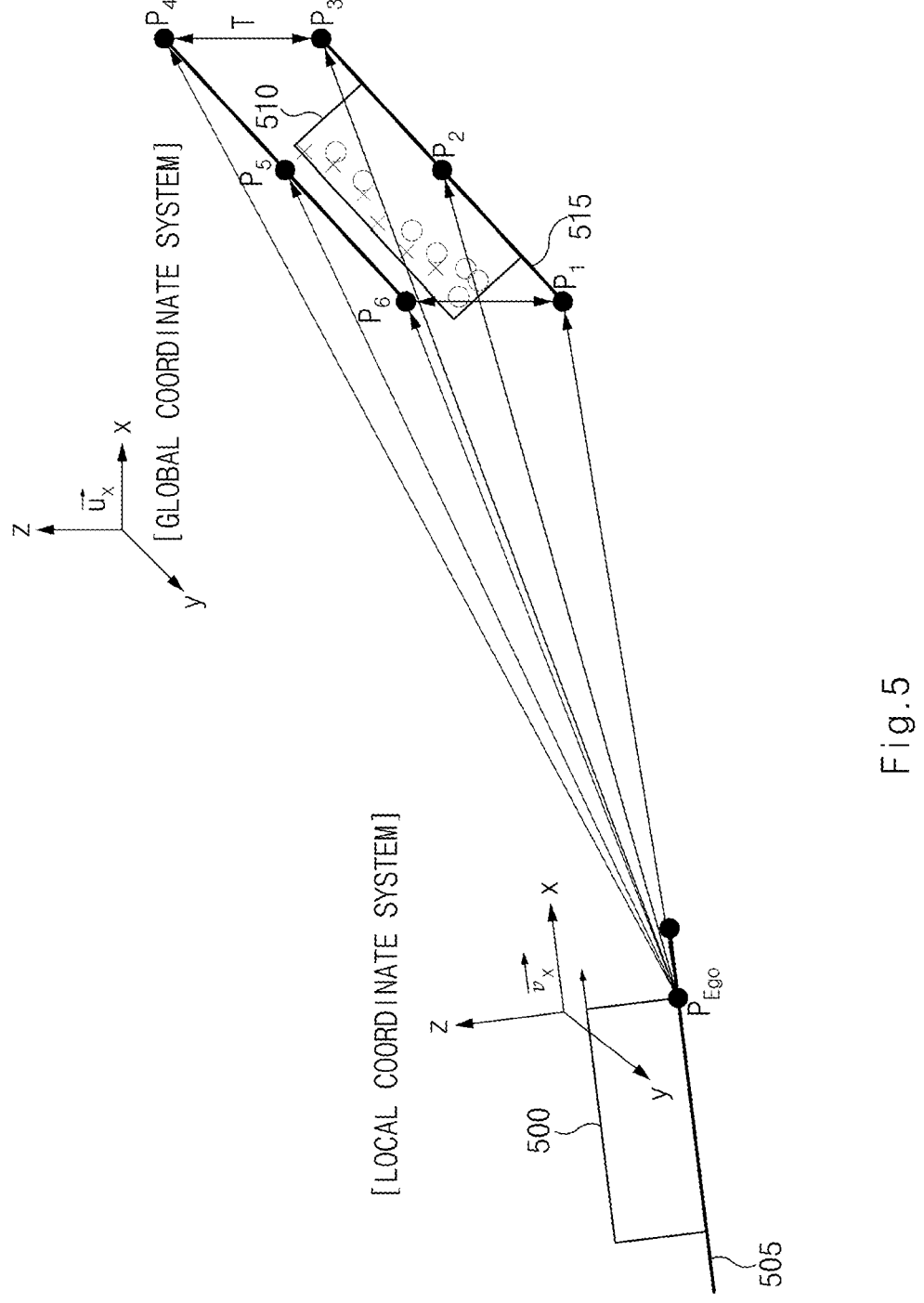
FIG. 5 is a drawing for describing a valid contour verification algorithm according to embodiments of the present disclosure.

FIG. 5 is a drawing for describing a valid contour verification algorithm according to embodiments of the present disclosure.

Referring to FIG. 5, a processor 150 of FIG. 1 may navigate a lane link 505 matched with a location of a vehicle 500 on a global coordinate system and a target lane link 515 matched with a location of another vehicle 510. The processor 150 may select profile points $P_1$, $P_2$, and $P_3$ based on a location and/or a contour of the other vehicle 510 on the target lane link 515. The processor 150 may reflect a valid height T in global coordinates of the selected profile points $P_1$, $P_2$, and $P_3$ to calculate global coordinates of profile points $P_4$, $P_5$ 및 $P_6$. The valid height T may be determined based on a height of the other vehicle 510. The processor 150 may calculate a vector for each of the profile points $P_1$, $P_2$, $P_3$, $P_4$, $P_5$, $P_6$ with reference to a center point $P_{Ego}$ of the front bumper of the vehicle 500 on the lane link 505 as follows.

$$\overrightarrow{v_{Global,1}} = P_1 - P_{Ego}$$

$$\overrightarrow{v_{Global,2}} = P_2 - P_{Ego}$$

$$\overrightarrow{v_{Global,3}} = P_3 - P_{Ego}$$

$$\overrightarrow{v_{Global,4}} = P_4 - P_{Ego}$$

$$\overrightarrow{v_{Global,5}} = P_5 - P_{Ego}$$

$$\overrightarrow{v_{Global,6}} = P_6 - P_{Ego}$$

The processor 150 may transform the vectors $\overrightarrow{v_{Global,1}}$, $\overrightarrow{v_{Global,2}}$, $\overrightarrow{v_{Global,3}}$, $\overrightarrow{v_{Global,4}}$, $\overrightarrow{v_{Global,5}}$, and $\overrightarrow{v_{Global,6}}$ calculated with respect to the center point $P_{Ego}$ of the front bumper of the vehicle 500 into a local coordinate system of the vehicle 500 as follows.

$$\overrightarrow{v_{Local,1}} = R_z(\theta_3)R_y(\theta_2)R_x(\theta_1)\overrightarrow{v_{Global,1}}$$

$$\overrightarrow{v_{Local,2}} = R_z(\theta_3)R_y(\theta_2)R_x(\theta_1)\overrightarrow{v_{Global,2}}$$

$$\overrightarrow{v_{Local,3}} = R_z(\theta_3)R_y(\theta_2)R_x(\theta_1)\overrightarrow{v_{Global,3}}$$

$$\overrightarrow{v_{Local,4}} = R_z(\theta_3)R_y(\theta_2)R_x(\theta_1)\overrightarrow{v_{Global,4}}$$

$$\overrightarrow{v_{Local,5}} = R_z(\theta_3)R_y(\theta_2)R_x(\theta_1)\overrightarrow{v_{Global,5}}$$

$$\overrightarrow{v_{Local,6}} = R_z(\theta_3)R_y(\theta_2)R_x(\theta_1)\overrightarrow{v_{Global,6}}$$

Herein, $\theta_1$ denotes the angle formed with respect to the x-axis by the two unit vectors $\overrightarrow{u_x}$ and $\overrightarrow{v_x}$, $\theta_2$ denotes the angle formed with respect to the y-axis by the two unit vectors $\overrightarrow{u_x}$ and $\overrightarrow{v_x}$, and $\theta_3$ denotes the angle famed with respect to the z-axis by the two unit vectors $\overrightarrow{u_x}$ and $\overrightarrow{v_x}$.

$$R_x(\theta_1) = \begin{bmatrix} 1 & 0 & 0 \\ 0 & \cos\theta_1 & -\sin\theta_1 \\ 0 & \sin\theta_1 & \cos\theta \end{bmatrix}, R_y(\theta_2) = \begin{bmatrix} \cos\theta_2 & 0 & \sin\theta_2 \\ 0 & 1 & 0 \\ -\sin\theta_2 & 0 & \cos\theta_2 \end{bmatrix}, \text{and}$$

$$R_z(\theta_3) = \begin{bmatrix} \cos\theta_3 & -\sin\theta_3 & 0 \\ \sin\theta_3 & \cos\theta_3 & 0 \\ 0 & 0 & 1 \end{bmatrix}.$$

The processor 150 may calculate local coordinates $P'_1$, $P'_2$, $P'_3$, $P'_4$, $P'_5$, and $P'_6$ of profile points of the target lane link based on the transformed vectors $\overrightarrow{v_{Local,1}}$, $\overrightarrow{v_{Local,2}}$, $\overrightarrow{v_{Local,3}}$, $\overrightarrow{v_{Local,4}}$, $\overrightarrow{v_{Local,5}}$, and $\overrightarrow{v_{Local,6}}$. The processor 150 may generate a polygon formed by the local coordinates $P'_1$, $P'_2$, $P'_3$, $P'_4$, $P'_5$, and $P'_6$ of the profile points of the target lane link. The generated polygon may be used as a valid contour region, that is, a high confidence section of an object.

Figure 6:
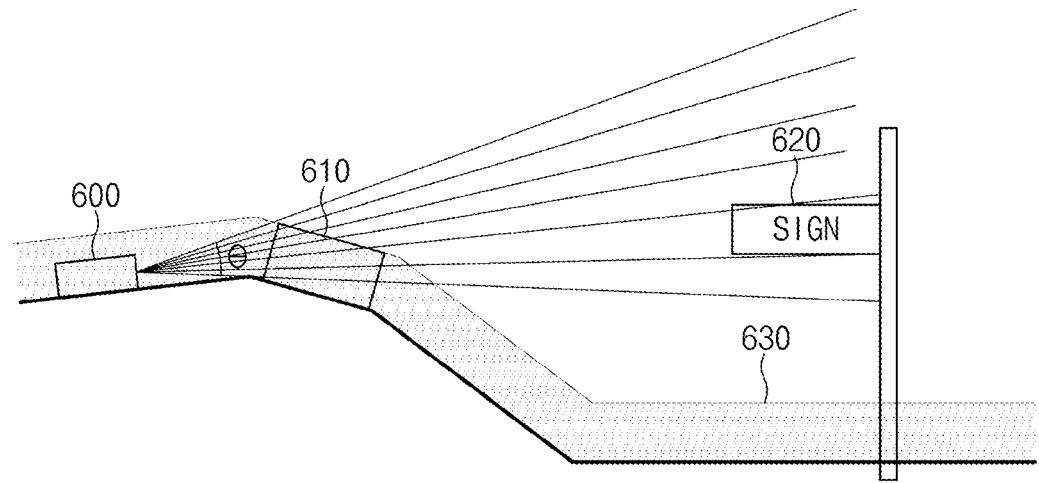
FIG. 6 is a drawing illustrating an example of improving misrecognition of a sign according to embodiments of the present disclosure.

FIG. 6 is a drawing illustrating an example of improving misrecognition of a sign according to embodiments of the present disclosure.

When there is another vehicle 610 and a sign 620 in front of a vehicle 600 when the vehicle 600 travels on a hill section, the sign 620 may be misrecognized as an object located on a lane on which the vehicle 600 travels due to a road gradient. An autonomous driving control apparatus 100 according to embodiments of the present disclosure may set a valid contour region 630 with respect to a lane road surface using a valid contour verification algorithm. The autonomous driving control apparatus 100 may filter a sign 620 located out of the valid contour region 630 and may recognize only the other vehicle 610 located within the valid contour region 630 as an object.

Figure 7:
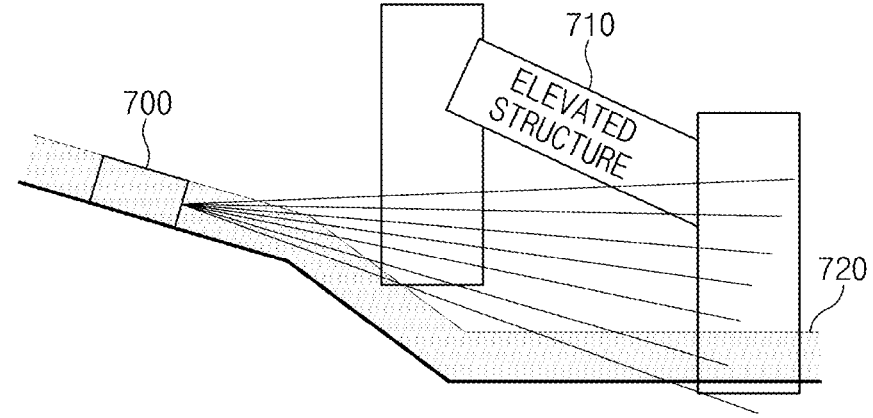
FIG. 7 is a drawing illustrating an example of improving misrecognition of an elevated structure according to embodiments of the present disclosure.

FIG. 7 is a drawing illustrating an example of improving misrecognition of an elevated structure according to embodiments of the present disclosure.

When a vehicle 700 travels on a downhill section, an elevated structure 710 located in front of the vehicle 700 may be recognized as an object located on a road where the vehicle 700 travels. An autonomous driving control apparatus 100 according to embodiments of the present disclosure may set a valid contour region 720 with respect to a road surface of a road where the vehicle 700 travels and may filter the elevated structure 710 located out of the valid contour region 720. Thus, the autonomous driving control apparatus 100 may fail to misrecognize the elevated structure 710 as an object located on a road where the vehicle 700 travels.

Figure 8:
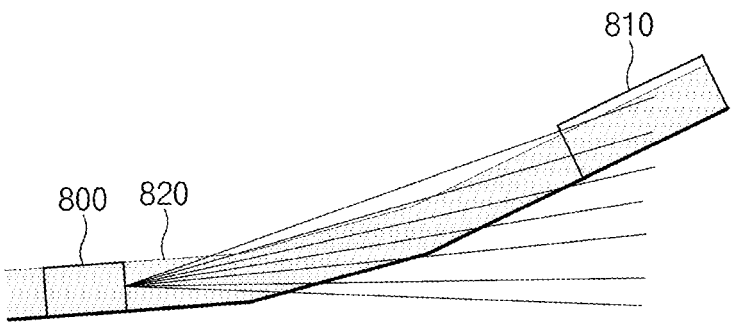
FIG. 8 is a drawing illustrating an example of improving non-recognition of an object according to embodiments of the present disclosure.

FIG. 8 is a drawing illustrating an example of improving non-recognition of an object according to embodiments of the present disclosure.

When a vehicle 800 starts to travel on an uphill section and when there is another vehicle 810 on the uphill section, the other vehicle 810 may be misrecognized. An autonomous driving control apparatus 100 according to embodiments of the present disclosure may set a valid contour region 820 with respect to a road surface of a road where the vehicle 800 travels, thus recognizing the other vehicle 810 as an object.

According to various embodiments, the autonomous driving control apparatus 100 may determine whether an altitude of an object is valid. When it is determined that the altitude of the object is not valid, the autonomous driving control apparatus 100 may filter the object, thus minimizing object misrecognition and non-recognition.

According to embodiments of the present disclosure, the autonomous driving control apparatus may universally minimize object misrecognition and non-recognition even on a road with a change in road gradient, for example, a road, a slope of which gradually increases or decreases.

Furthermore, according to embodiments of the present disclosure, the autonomous driving control apparatus may minimize object misrecognition and non-recognition even when there is an occlusion on the road surface, because it is possible to determine a height of a valid contour of an object on any lane link.

Furthermore, according to embodiments of the present disclosure, the autonomous driving control apparatus may determine a height of a valid contour of an object irrespective of a road shape, an occlusion, a connection relationship, thus reducing an object misrecognition rate associated with a gradient, for example, sign misrecognition in a hill section, object misrecognition by a lateral gradient while the host vehicle makes a lane change, object misrecognition by a longitudinal gradient and a lateral gradient while the host vehicle makes a U-turn, and misrecognition of distant bushes in a hill section.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed based on the accompanying claims, and all the technical ideas within the scope equivalent to the claims should be included in the scope of the present disclosure.

What is claimed is:

1. An autonomous driving control apparatus, comprising:
a sensor configured to obtain information about an object around a vehicle;
a communication device configured to receive information about a high definition map around the vehicle; and
a processor electrically connected with the sensor and the communication device,
wherein the processor is configured to:
navigate a vehicle lane link and a target lane link based on the information about the object and the information about the high definition map;
determine a valid contour region by applying a valid contour verification algorithm to the vehicle lane link and the target lane link; and
recognize an object in the valid contour region,
wherein the processor is configured to:
calculate a vector between the vehicle lane link and the target lane link;
rotational transform the calculated vector into a local coordinate system with respect to a center point of a front bumper of the vehicle; and
set the valid contour region based on the rotational transformed vector.

2. The autonomous driving control apparatus of claim 1, wherein the processor is configured to navigate a lane link matched with a vehicle location on a global coordinate system as the vehicle lane link.

3. The autonomous driving control apparatus of claim 1, wherein the processor is configured to navigate all lane links within a predetermined radius with respect to a vehicle location on a global coordinate system as the target lane link.

4. The autonomous driving control apparatus of claim 1, wherein the processor is configured to navigate a lane link matched with a location of the object around the vehicle on a global coordinate system as the target lane link.

5. The autonomous driving control apparatus of claim 1, wherein the processor is configured to:
calculate profile points by reflecting a valid height in profile points of the target lane link; and
calculate the vector for the profile points of the target lane link and the profile points in which the valid height is reflected with respect to a profile point of the vehicle lane link, the profile point being matched with the center point of the front bumper of the vehicle.

6. The autonomous driving control apparatus of claim 5, wherein the valid height is determined by a height for each object.

7. The autonomous driving control apparatus of claim 5, wherein the processor is configured to transform global coordinates of the profile points of the target lane link and the profile points in which the valid height is reflected into local coordinates.

8. The autonomous driving control apparatus of claim 7, wherein the processor is configured to:
generate a polygon using the profile points converted into the local coordinates; and
set the valid contour region based on the polygon.

9. The autonomous driving control apparatus of claim 1, wherein the processor is configured to:
determine a projective point onto which a contour point of the object is projected is located within the valid contour region;
determine the contour point of the object as a valid contour point, in response to a determination that the projective point is located within the valid contour region;
determine the contour point of the object as an invalid contour point, in response to a determination that the projective point is not located within the valid contour region; and
filter an object having the invalid contour point.

10. An autonomous driving control method, comprising:
receiving, by a processor, information about an object around a vehicle and a high definition map around the vehicle;
navigating, by the processor, a vehicle lane link and a target lane link based on the information about the object and the high definition map;
determining, by the processor, a valid contour region by applying a valid contour verification algorithm to the vehicle lane link and the target lane link; and
recognizing, by the processor, an object in the valid contour region,
wherein the determining the valid contour region includes:
calculating, by the processor, a vector between the vehicle lane link and the target lane link;
rotational transforming, by the processor, the calculated vector into a local coordinate system with respect to a center point of a front bumper of the vehicle; and
setting, by the processor, the valid contour region based on the rotational transformed vector.

11. The autonomous driving control method of claim 10, wherein the navigating the vehicle lane link and the target lane link includes:
navigating, by the processor, a lane link matched with a vehicle location on a global coordinate system as the vehicle lane link; and
navigating, by the processor, all lane links within a predetermined radius with respect to the vehicle location as the target lane link.

12. The autonomous driving control method of claim 10, wherein the navigating the vehicle lane link and the target lane link includes:
navigating, by the processor, a lane link matched with a vehicle location on a global coordinate system as the vehicle lane link; and
navigating, by the processor, a location of the object around the vehicle as the target lane link.

13. The autonomous driving control method of claim 10, wherein the calculating the vector includes:
calculating, by the processor, profile points by reflecting a valid height in profile points of the target lane link; and
calculating, by the processor, the vector for the profile points of the target lane link and the profile points in which the valid height is reflected with respect to a profile point of the vehicle lane link, the profile point being matched with the center point of the front bumper of the vehicle.

14. The autonomous driving control method of claim 13, wherein the valid height is determined by a height for each object.

15. The autonomous driving control method of claim 13, wherein the rotating and transforming includes:

transforming, by the processor, global coordinates of the profile points of the target lane link and the profile points in which the valid height is reflected into local coordinates.

16. The autonomous driving control method of claim 15, wherein the setting of the valid contour region includes:

generating, by the processor, a polygon using the profile points converted into the local coordinates; and setting, by the processor, the valid contour region based on the polygon.

17. The autonomous driving control method of claim 10, wherein the recognizing of the object includes:

determining, by the processor, a projective point onto which a contour point of the object is projected is located within the valid contour region;

determining, by the processor, the contour point of the object as a valid contour point, in response to a determination that the projective point is located within the valid contour region;

determining, by the processor, the contour point of the object as an invalid contour point, in response to a determination that the projective point is not located within the valid contour region; and filtering, by the processor, an object having the invalid contour point.

18. The autonomous driving control method of claim 10, further comprising:

analyzing, by the processor, only an object in the valid contour region to determine a situation around the vehicle;

determining, by the processor, a driving strategy according to the situation around the vehicle;

generating, by the processor, a driving route and a speed profile based on the driving strategy; and controlling, by the processor, a behavior of the vehicle depending on the driving route and the speed profile.

\* \* \* \* \*